United States Patent
Huang et al.

(10) Patent No.: US 10,937,132 B2
(45) Date of Patent: Mar. 2, 2021

(54) SPIKE SIGNAL-BASED DISPLAY METHOD AND SYSTEM

(71) Applicant: Peking University, Beijing (CN)

(72) Inventors: Tiejun Huang, Beijing (CN); Lin Zhu, Beijing (CN); Yonghong Tian, Beijing (CN); Yihua Fu, Beijing (CN); Jianing Li, Beijing (CN); Siwei Dong, Beijing (CN); Yaowei Wang, Beijing (CN)

(73) Assignee: Peking University, Beijing (CN)

( * ) Notice: Subject to any disclaimer, the term of this patent is extended or adjusted under 35 U.S.C. 154(b) by 0 days.

(21) Appl. No.: 16/666,969

(22) Filed: Oct. 29, 2019

(65) Prior Publication Data
US 2020/0226723 A1 Jul. 16, 2020

(30) Foreign Application Priority Data
Jan. 11, 2019 (CN) .......................... 201910027914.X

(51) Int. Cl.
G06T 5/00 (2006.01)
G06K 9/62 (2006.01)

(52) U.S. Cl.
CPC ............ G06T 5/003 (2013.01); G06K 9/6202 (2013.01); G06T 5/009 (2013.01); G06T 2207/20084 (2013.01)

(58) Field of Classification Search
CPC ..................... G06T 5/003; G06T 5/009; G06T 2207/20084; G06T 2207/20012;
(Continued)

(56) References Cited

U.S. PATENT DOCUMENTS

2002/0047818 A1 4/2002 Yamamoto et al.
2006/0022982 A1* 2/2006 Sekigawa ........... G03F 7/70291
345/441
(Continued)

FOREIGN PATENT DOCUMENTS

CN 101738380 A 6/2010
CN 105681787 A 6/2016
(Continued)

OTHER PUBLICATIONS

First Office Action dated Nov. 25, 2019 received in Chinese Patent Application No. CN 201910027914.X together with an English language translation.

*Primary Examiner* — Xilin Guo
(74) *Attorney, Agent, or Firm* — Scully Scott Murphy & Presser

(57) ABSTRACT

A spike signal-based display method and a spike signal-based display system are disclosed by the present application. The method includes: analyzing a spike sequence corresponding to a single pixel position to obtain spike-firing information; acquiring respective pixel values corresponding to multiple spike-firing times before a single spike-firing time, and accumulating the pixel values as a first accumulated pixel value; setting a first specific amount corresponding to the single spike-firing time of the pixel position, and summing the first specific amount and the first accumulated pixel value to obtain a first pixel value of the pixel position; comparing the first pixel value with a pixel threshold range, and obtaining a second specific amount based on the first specific amount; and obtaining a second pixel value of the pixel position by summing the first accumulated pixel value and the second specific amount, and generating an image by using the second pixel values. Since the pixel values are calculated using the time domain characteristic of the spike signal, an image with high quality (Continued)

is formed and an image at any continuous time instant is output. The quality of the generated image is improved by adjusting the pixel values based on the pixel threshold range.

12 Claims, 3 Drawing Sheets

(58) Field of Classification Search
CPC ............ G06T 2207/10016; G06T 5/00; G06K 9/6202; G06K 9/62
See application file for complete search history.

(56) References Cited

U.S. PATENT DOCUMENTS

2020/0200923 A1* 6/2020 Nishihara ............. G01T 1/2002
2020/0309955 A1* 10/2020 Laflaquiere ............. G01S 7/484

FOREIGN PATENT DOCUMENTS

| CN | 105721783 | A | 6/2016 |
| CN | 106845541 | A | 6/2017 |
| CN | 107333040 | A | 11/2017 |
| CN | 108881906 | A | 11/2018 |
| CN | 109039980 | A | 12/2018 |
| CN | 109102000 | A | 12/2018 |
| JP | 5029608 | B | 9/2012 |
| JP | 5116619 | B | 1/2013 |

* cited by examiner

SPIKE SIGNAL-BASED DISPLAY METHOD AND SYSTEM

TECHNICAL FIELD

The present disclosure relates to the technical field of signal processing, and in particular to a spike signal-based display method and system.

BACKGROUND

Machine vision algorithms based on traditional image sensors have been widely used in many fields such as intelligent safeguard and intelligent transportation. However, the traditional image sensors become increasingly incapable of meeting current visual mission requirements due to design concepts thereof. These sensors generally perform a complete sampling on a scenario at a preset fixed frequency and in a unit of frame. Such sampling based on fixed frame rate cannot reflect a dynamic change of the scenario, and is prone to an oversampling or undersampling on the current scenario, thereby causing problems such as a large redundancy of video data, a low time domain resolution, and blurring under high speed motion. Inspired by a visual sampling mechanism of biological retina, new types of cameras that collect spike array signals are developed, including sensors that fire spike signals based on a change in illumination intensity, such as Dynamic Vision Sensor (DVS), Asynchronous Time-based image Sensor (ATIS) and Dynamic and Active Pixel Vision Sensor (DAVIS), and sensors that fire signals based on accumulative illumination intensity, such as illumination intensity accumulation sensors. Sensors of such type of cameras collecting information of optical signals in a certain region during a certain period of time, and have advantages of high dynamic range, high time resolution, and the like.

The spike signals involved in the present disclosure have the following features: collecting spatiotemporal signals of individual local spatial positions in a monitored region, and accumulating the spatiotemporal signals of the local spatial positions based on time to obtain a accumulative signal intensity value; transforming the accumulative signal intensity value by a filter, and outputting a spike signal when the transformation result exceeds a certain threshold; arranging the spike signals corresponding to the local spatial positions in a sequence in a chronological order to obtain a spike sequence representing the local spatial position signal and its change; and arranging the spike sequences of all the local spatial positions based on a spatial position relationship to obtain spike array signals.

Transforming signals into human-viewable display forms is the first step in intuitively understanding spike signals. Since most of the existing machine learning algorithms cannot directly process spike signals as data sources, it is desired to provide a technology capable of visualizing spike signals.

SUMMARY

In order to solve the above problems, a spike signal-based display method and a spike signal-based display system are provided according to the present disclosure.

In an aspect, a spike signal-based display method is provided according to the present disclosure. The method includes:

analyzing a spike sequence corresponding to a single pixel position to obtain spike-firing information of the spike sequence, the spike-firing information including multiple spike-firing times;

acquiring pixel values corresponding to multiple spike-firing times before a single spike-firing time, and accumulating the pixel values as a first accumulated pixel value;

setting a first specific amount corresponding to the single spike-firing time of the pixel position, and summing the first specific amount and the first accumulated pixel value to obtain a first pixel value of the pixel position;

comparing the first pixel value with a pixel threshold range, and obtaining a second specific amount by adjusting the first specific amount; and obtaining a second pixel value of the pixel position by summing the first accumulated pixel value and the second specific amount.

Preferably, the acquiring a first accumulated pixel value of pixel values corresponding to multiple spike-firing times before a single spike-firing time includes:

determining an accumulated time duration before the single spike-firing time;

acquiring respective pixel values corresponding to the spike-firing times during the accumulated time duration;

calculating respective attenuation values of the pixel values after they are attenuated when reaching the single spike-firing time; and obtaining the first accumulated pixel value by summing the attenuation values.

Preferably, the acquiring pixel values corresponding to the spike-firing times during the accumulated time duration includes:

setting the first accumulated pixel value at 0 if there is no spike-firing time in the accumulated time duration.

Preferable, the comparing the first pixel value with a pixel threshold range, and obtaining a second specific amount by adjusting the first specific amount includes:

obtaining the second specific amount by adjusting the value of the first specific amount if the first pixel value is not within the pixel threshold range; and determining the first specific amount as the second specific amount if the first pixel value is within the pixel threshold range.

Preferably, the pixel threshold range includes: a fixed value set as the pixel threshold range, and/or a pixel threshold range determined based on normalized global pixel values, and/or a pixel threshold range determined based on an ideal dynamic range of image.

Preferably, the setting the first specific amount includes setting the first specific amount as a fixed value.

Preferably, the pixel values are obtained based on a function in which the pixel values are attenuated with the spike-firing time, including: attenuated at a fixed ratio, attenuated at a fixed magnitude, and/or attenuated by being decreased with a decreasing part of the function.

Preferably, after the obtaining the second pixel value of the pixel position by summing the first accumulated pixel value and the adjusted first specific amount, the method further includes: filtering the second pixel value based on a temporal neighbor relationship of the pixel values at the single pixel position.

Preferably, the method further includes: generating an image by using second pixel values of all pixel positions at the same spike-firing time, including:

directly restoring an image by using the second pixel values of all pixel positions at the same spike-firing time, and/or forming an image after the second pixel values are filtered, based on a spatial neighbor relationship of all pixel positions, and/or forming an image after the second pixel values are filtered, based on a spatiotemporal neighbor relationship of all pixel positions.

In a second aspect, a spike signal-based display system is provided according to the present disclosure. The system includes a spike analysis module, a dynamic adjustment module and an image display module connected in sequence; wherein the spike analysis module is configured to analyze spike data to obtain spike-firing information corresponding to individual spike sequences of individual pixel positions;

the dynamic adjustment module is configured to determine a pixel threshold range based on the spike-firing information, and calculate pixel values of the pixel positions; and the image display module is configured to generate an image and output the generated image.

The present disclosure has the following advantages. Spike-firing information of spike sequences is obtained by analyzing spike data. Pixel values are calculated based on the spike-firing information. Spike signals can be visually displayed based on a biological neuron spike-firing mechanism. In this way, the time domain characteristic of the spike signal is effectively utilized, an image with high quality is formed and an image at any continuous time instant is output. Firing information (firing frequency) in the spike signal is calculated and a statistic can be made. Pixel values during an accumulated time duration of pixel positions and a global pixel value of the entire image is calculated, thereby determining a pixel threshold range of each pixel position. In this way, pixel thresholds can be respectively set for pixels at the pixel positions based on temporal and spatial relationships, so that the pixel thresholds of the respective pixel positions are relatively independent, thereby effectively improving the quality of an output image. In a case where a difference between the first pixel and the pixel threshold range is small, the pixel threshold range is adjusted to include the first pixel value, which is advantageous for quality improvement of finally generated image. An unclearness caused by over-bright image or over-dark image can be reduced by adjusting the pixel values of the finally generated image based on the pixel threshold range. By calculating the pixel values in the accumulated time durations of the pixel positions and dynamically adjusting the first specific amount, the processing on the pixels in subsequent steps can be facilitated. The method is applicable to data in various spike forms, including the generation of color images. The generated image can be used as a data source for machine learning algorithms and other image and video recognition algorithms.

BRIEF DESCRIPTION OF THE DRAWINGS

Upon reading the following detailed description of preferred embodiments, various other advantages and benefits will become apparent to those skilled in the art. The drawings are provided only for illustrating the preferred embodiments and should not be construed as limiting the present disclosure. Identical components are denoted by identical reference signs throughout the drawings, wherein.

DETAILED DESCRIPTION

Figure 1:
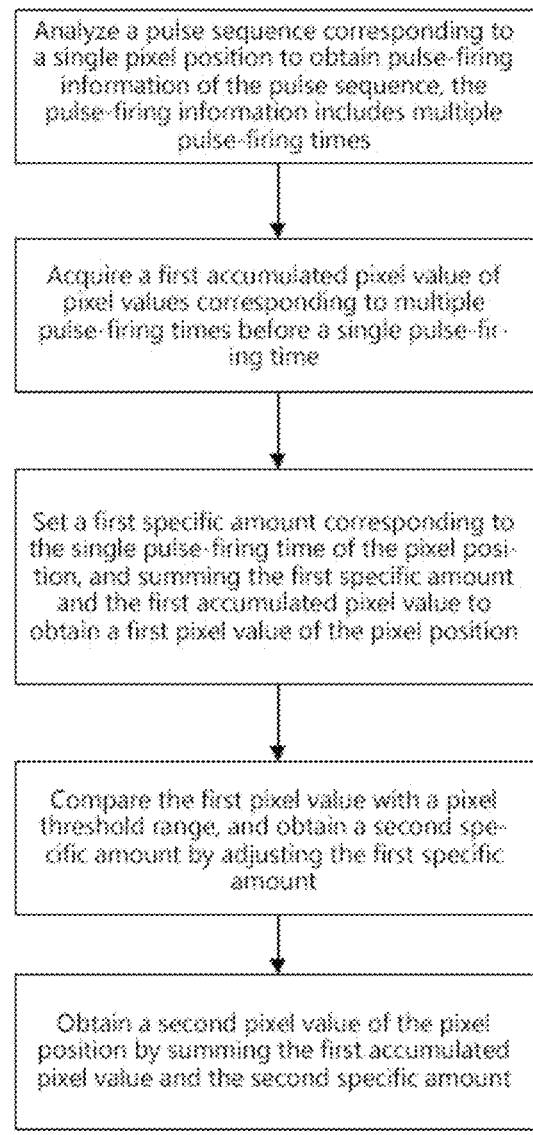
FIG. 1 is a schematic diagram showing steps of a spike signal-based display method according to the present disclosure.

Exemplary embodiments of the present disclosure are described in detail below with reference to the drawings. Although the exemplary embodiments of the present disclosure are shown in the drawings, it should be understood that the present disclosure can be implemented in various forms and should not be limited to the embodiments set forth herein. Rather, these embodiments are provided so that the present disclosure can be thoroughly understood and the scope of the present disclosure can be fully conveyed to those skilled in the art.

A spike signal-based display method is provided according to an embodiment of the present disclosure. As shown in FIG. 1, the method includes:

analyzing a spike sequence corresponding to a single pixel position to obtain spike-firing information of the spike sequence, the spike-firing information including multiple spike-firing times;

acquiring pixel values corresponding to multiple spike-firing times before a single spike-firing time, and accumulating the pixel values as a first accumulated pixel value;

setting a first specific amount corresponding to the single spike-firing time of the pixel position, and summing the first specific amount and the first accumulated pixel value to obtain a first pixel value of the pixel position;

comparing the first pixel value with a pixel threshold range, and obtaining a second specific amount by adjusting the first specific amount; and obtaining a second pixel value of the pixel position by summing the first accumulated pixel value and the second specific amount.

The acquiring a first accumulated pixel value of pixel values corresponding to multiple spike-firing times before a single spike-firing time includes:

determining an accumulated time duration before the single spike-firing time;

acquiring respective pixel values corresponding to the spike-firing times during the accumulated time duration;

calculating respective attenuation values of the pixel values after they are attenuated when reaching the single spike-firing time; and obtaining the first accumulated pixel value by summing the attenuation values.

The acquiring respective pixel values corresponding to the spike-firing times during the accumulated time duration includes:

setting the first accumulated pixel value at 0 if there is no spike-firing time in the accumulated time duration.

For a pixel at each position, if a spike occurs at a current time instant $t_0$, the pixel value $I(t_0)$ of the pixel at the current time instant changes as follows:

$$I(t_0) = I(t_0) + \frac{\Delta}{\tau}\exp\left(1 - \frac{\Delta}{\tau}\right)$$

where $I(t_0)$ is an initial value (first pixel value) of the pixel, $\Delta$ is a delay factor, $\tau$ is a model parameter, and exp is an exponential function with a natural constant e being the base.

In a case where the pixel value is superimposed at the time instant when the spike occurs, a superimposition amount is gradually attenuated over time, and the pixel value at a time instant t ($t > t_0$) is:

$$I(t) = I(t_0) + \frac{t - t_0 - \Delta}{\tau}\exp\left(1 - \frac{t - t_0 - \Delta}{\tau}\right)$$

where $I(t)$ is a value of the first pixel value after being attenuated at the time instant t, and the upper and lower limits of the pixel value and the attenuating rate can be adjusted by adjusting the model parameter $\tau$ and the attenuating factor $\tau$.

The comparing the first pixel value with a pixel threshold range, and obtaining a second specific amount by adjusting the first specific amount, includes:

The adjusting the value of the first specific amount includes: increasing or decreasing the value of the first specific amount, to make a value obtained by superimposing the value of the first specific amount with the first accumulated pixel value be within the pixel threshold range. By adjusting the value of the first specific amount, the resulting second specific amount can express more information as compared to the values of second specific amounts of all spatial pixels.

The pixel threshold range includes: a fixed value set as the pixel threshold range, and/or a pixel threshold range determined based on normalized global pixel values, and/or a pixel threshold range determined based on an ideal dynamic range of image. Each pixel has a relatively independent pixel threshold range.

The determining the pixel threshold range based on normalized global pixel values includes: based on spike firing conditions of pixel positions at the same time instant and based on first pixels, judging whether most of the first pixel values at the time instant is too small or too large; if yes, normalizing the first pixel values based on the global pixel value to determine a pixel threshold range. In this way, the generated image is prevented from being too bright or too dark, which will cause unclear displayed content.

If the first pixel value is out of the pixel threshold range but is very close to the pixel threshold range, the pixel threshold range is changed to include the first pixel value.

The setting the first specific amount includes setting the first specific amount as a fixed value. The fixed value includes a function which is attenuated over time.

The first specific amount is 0 when there is no spike to fire.

The first specific amount can also be dynamically adjusted based on the accumulated time duration before the single spike-firing time. In a case where multiple dense spike firings occur in the accumulated time duration before the single spike-firing time, the value of the first specific amount is dynamically reduced.

The pixel values are obtained based on a function in which the pixel values are attenuated with the spike-firing time, including: attenuated at a fixed ratio, attenuated at a fixed magnitude, and/or attenuated by being decreased with a decreasing part of the function.

The function includes the Gaussian function, the Exponential function and the Logarithmic function, or includes a biological neuron model.

After the obtaining the second pixel value of the pixel position by summing the first accumulated pixel value and the adjusted first specific amount, the method further includes: filtering the second pixel value based on a temporal neighbor relationship of the pixel values at the single pixel position.

The method includes generating an image by using first accumulated/first/second pixel values of all pixel positions at the same spike-firing time.

The generating an image by using first accumulated/first/second pixel values of all pixel positions at the same spike-firing time includes:

directly restoring an image by using the first accumulated/first/second pixel values of all pixel positions at the same spike-firing time, and/or forming an image after the first accumulated/first/second pixel values are filtered, based on a spatial neighbor relationship of all pixel positions, and/or forming an image after the first accumulated/first/second pixel values are filtered, based on a spatiotemporal neighbor relationship of all pixel positions.

For generating an image by using the pixel values, a good effect is achieved when the image is generated by using the second pixel values.

Displaying a spike signal of a certain pixel position at a certain time instant in the spike data is taken as an example, and it is assumed that the certain time instant is t, and the certain pixel position is the position of a pixel P.

Figure 2:
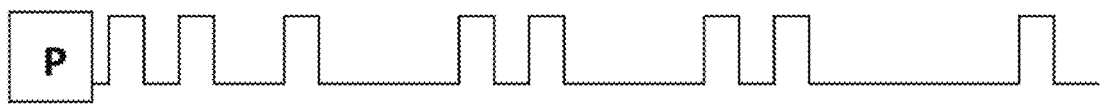
FIG. 2 is a schematic diagram showing pixels and a spike sequence of a spike signal-based display method according to the present disclosure.

A spike sequence corresponding to the position of the pixel P is analyzed to obtain spike-firing information of the spike sequence, and the spike-firing information includes multiple spike-firing times. FIG. 2 is a spike sequence corresponding to the position of the pixel P.

A first accumulated pixel value of pixel values corresponding to multiple spike-firing times before the time instant t is acquired.

Figure 3:
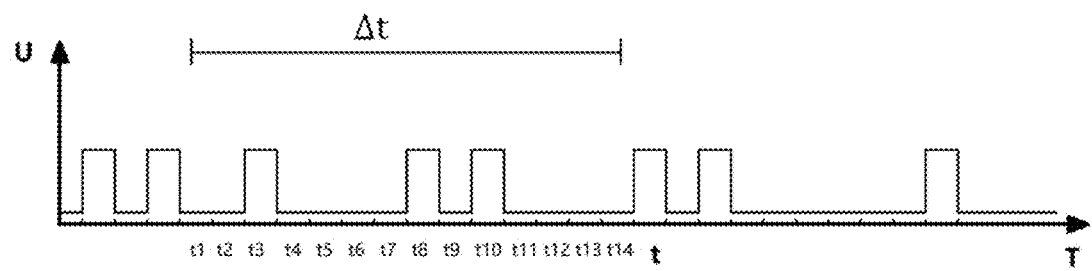
FIG. 3 is a schematic diagram showing a spike sequence of a spike signal-based display method according to the present disclosure.

FIG. 3 shows the spike sequence of the position P.

A historical time before the time instant t is determined based on the spike-firing information. It is assumed that $\Delta t$ is an accumulated time duration before the time instant t.

Pixel values corresponding to spike-firing times in the accumulated time duration ($\Delta t$) are acquired. Attenuation values of the pixel values after they are attenuated when reaching the single spike-firing time (the time instant t) are calculated.

The attenuation values are summed to obtain a first accumulated pixel value. As shown in FIG. 3, there are totally 14 accumulated time instants in the time duration $\Delta t$ before the time instant t, which are set as time instants t1 to t14 respectively. Attenuation values of the pixel values after they are attenuated when reaching the single spike-firing time are calculated. There are spikes firing at the time instant t3, time instant t8 and time instant t10 respectively. It is assumed that the spike at the time instant t3 is an accumulated first spike, the spike at the time instant t8 is an accumulated second spike and the spike at the time instant t10 is an accumulated third spike.

A specific amount is added at the time instant t3, time instant t8 and time instant t10 respectively. A value of each specific amount at each of the above time instants after it is attenuated when reaching the time instant t is calculated, and pixel values of the three accumulated time instants after attenuation are obtained. The three pixel values after attenuation are summed to obtain a first accumulated pixel value.

The first accumulated pixel value is 0 if there is no spike fired during the time duration Δt.

A first specific amount corresponding to the single spike-firing time (the time instant t) of the position P of the pixel is set, and the first specific amount and the first accumulated pixel value are summed to obtain a first pixel value of the position P of the pixel.

The first pixel value is compared with the pixel threshold range, and the first specific amount is adjusted. The pixel threshold range of the pixel P is calculated by setting the pixel threshold range and/or determining the pixel threshold range based on normalized global pixel values and/or determining the pixel threshold range based on an ideal dynamic range of image. Based on the pixel threshold range corresponding to the position P of the pixel, whether the first pixel value is within the range is judged. The value of the first specific amount is adjusted, and a second specific amount is obtained.

The first accumulated pixel value of the position P of the pixel and the second specific amount are summed to obtain a second pixel value of the position P of the pixel.

The second pixel value of the position P of the pixel may be filtered based on a temporal neighbor relationship as required. That is, second pixel values of respective accumulated time instants of the position P of the pixel before the time instant t are calculated based on a temporal neighbor relationship of pixel values at the position P of the pixel. Then, a curve of the second pixel values corresponding to the respective accumulated time instants is obtained. The second pixel values at the time instant t are filtered based on the curve to obtain the filtered second pixel values.

The filtering based on the temporal neighbor relationship includes: filtering second pixel values of all global pixel positions based on the temporal neighbor relationship, or only filtering second pixel values of some pixel positions based on the temporal neighbor relationship.

Second pixel values of all pixel positions at the time instant t are calculated using the above method, and an image at the time instant t is formed using the second pixel values of all the pixel positions.

The forming an image at the time instant t using the second pixel values of all the pixel positions includes:

directly restoring an image by using the second pixel values of all pixel positions at the same spike-firing time, and/or forming an image after the second pixel values are filtered, based on a spatial neighbor relationship of all pixel positions, and/or forming an image after the second pixel values are filtered, based on a spatiotemporal neighbor relationship of all pixel positions.

Figure 4:
FIG. 4 is a schematic diagram showing an output image of a spike signal-based display method according to the present disclosure.

FIG. 4 is a clear image on a rotary disc rotating at high speed, which is restored (generated) using spike data.

Figure 5:
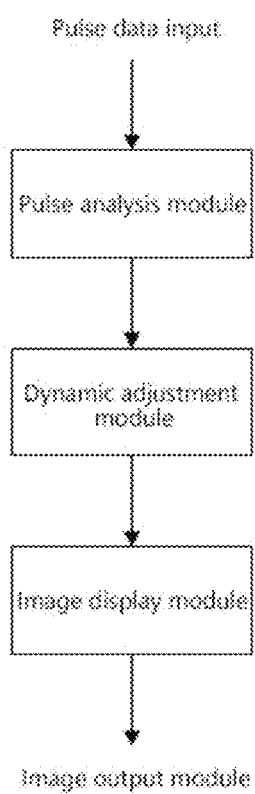
FIG. 5 is a schematic diagram showing a spike signal-based display system according to the present disclosure.

A spike signal-based display system is further provided according to an embodiment of the present disclosure. As shown in FIG. 5, the system includes: a spike analysis module, a dynamic adjustment module and an image display module connected in sequence.

The spike analysis module is configured to analyze spike data to obtain spike-firing information corresponding to individual spike sequences of individual pixel positions.

The dynamic adjustment module is configured to determine a pixel threshold range based on the spike-firing information, and calculate pixel values of the pixel positions.

The image display module is configured to generate an image and output the generated image.

In the spike signal-based display method according to the present disclosure, spike-firing information of spike sequences is obtained by analyzing spike data. Pixel values are calculated based on the spike-firing information. Spike signals can be visually displayed based on a biological neuron spike-firing mechanism. In this way, the time domain characteristic of the spike signal is effectively utilized, an image with high quality is formed and an image at any continuous time instant is output. Firing information (firing frequency) in the spike signal is calculated and a statistic can be made. Pixel values during an accumulated time duration of pixel positions and a global pixel value of the entire image is calculated, thereby determining a pixel threshold range of each pixel position. In this way, pixel thresholds can be respectively set for pixels at the pixel positions based on temporal and spatial relationships, so that the pixel thresholds of the respective pixel positions are relatively independent, thereby effectively improving the quality of an output image. In a case where a difference between the first pixel and the pixel threshold range is small, the pixel threshold range is adjusted to include the first pixel value, which is advantageous for quality improvement of finally generated image. An unclearness caused by over-bright image or over-dark image can be reduced by adjusting the pixel values of the finally generated image based on the pixel threshold range. By calculating the pixel values in the accumulated time durations of the pixel positions and dynamically adjusting the first specific amount, the processing on the pixels in subsequent steps can be facilitated. The method is applicable to data in various spike forms, including the generation of color images. The generated image can be used as a data source for machine learning algorithms and other image and video recognition algorithms.

Described above are only preferred embodiments of the present application. However, the scope of protection of the present application is not limited thereto. Changes or alternatives that can be easily conceived by those skilled in the art within the technical scope disclosed in the present application will fall within the scope of protection of the present application. Therefore, the scope of protection of the present application shall be accorded in line with the appended claims.

The invention claimed is:

1. A spike signal-based display method, comprising:
analyzing a spike sequence corresponding to a single pixel position to obtain spike-firing information of the spike sequence, the spike-firing information comprises multiple spike-firing times;
acquiring respective pixel values corresponding to one or more spike-firing times before a single spike-firing time, and accumulating the pixel values as a first accumulated pixel value;
setting a first specific amount corresponding to the single spike-firing time of the pixel position, and summing the first specific amount and the first accumulated pixel value to obtain a first pixel value of the pixel position;
comparing the first pixel value with a pixel threshold range, and obtaining a second specific amount based on the first specific amount;
obtaining a second pixel value of the pixel position by summing the first accumulated pixel value and the second specific amount or by directly using the second specific amount;
generating an image by using first accumulated/first/second pixel values of all pixel positions at the same spike-firing time; and
displaying the generated image.

2. The spike signal-based display method according to claim 1, wherein the acquiring a first accumulated pixel value of pixel values corresponding to multiple spike-firing times before a single spike-firing time comprises:
- determining an accumulated time duration before the single spike-firing time;
- acquiring respective pixel values corresponding to the spike-firing times during the accumulated time duration;
- calculating respective attenuation values of the pixel value after they are attenuated when reaching the single spike-firing time; and
- obtaining the first accumulated pixel value by summing the attenuation values.

3. The spike signal-based display method according to claim 2, wherein the acquiring respective pixel values corresponding to the spike-firing times during the accumulated time duration comprises:
- setting the first accumulated pixel value at 0 if there is no spike-firing time in the accumulated time duration.

4. The spike signal-based display method according to claim 2, wherein the acquiring respective pixel values corresponding to the spike-firing times during the accumulated time duration comprises:
- an input spike signal of a position can change first accumulated pixel values/specific amounts of one or more pixel positions, and a first pixel value of a position can also change second specific amounts/pixel values of one or more pixel positions.

5. The spike signal-based display method according to claim 1, wherein the comparing the first pixel value with a pixel threshold range, and obtaining a second specific amount by adjusting the first specific amount comprises:
- obtaining the second specific amount by adjusting the value of the first specific amount if the first pixel value is not within the pixel threshold range; and
- determining the first specific amount as the second specific amount if the first pixel value is within the pixel threshold range.

6. The spike signal-based display method according to claim 1, wherein the pixel threshold range comprises: a fixed value set as the pixel threshold range, and/or a pixel threshold range determined based on normalized global pixel values, and/or a pixel threshold range determined based on an ideal dynamic range of image.

7. The spike signal-based display method according to claim 1, wherein the setting the first specific amount comprises setting the first specific amount as a fixed value.

8. The spike signal-based display method according to claim 2, wherein the pixel values are obtained based on a function in which the pixel values are attenuated with the spike-firing time, comprising: attenuated at a fixed ratio, attenuated at a fixed magnitude, and/or attenuated by being decreased with a decreasing part of the function.

9. The spike signal-based display method according to claim 1, wherein after the obtaining the second pixel value of the pixel position by summing the first accumulated pixel value and the adjusted first specific amount, the method further comprises: filtering the second pixel value based on a temporal neighbor relationship of the pixel values at the single pixel position.

10. The spike signal-based display method according to claim 1, wherein the acquiring respective pixel values corresponding to multiple spike-firing times before a single spike-firing time comprises but is not limited to: estimating the pixel values based on the number of spikes during a fixed time duration before the spike-firing time, or estimating the pixel values based on an interval between the current spike-firing time and the last spike-firing time.

11. The spike signal-based display method according to claim 1, wherein the generating the image by using the first accumulated/first/second pixel values of all pixel positions at the same spike-firing time comprises:
- directly restoring an image by using the first accumulated/first/second pixel values of all pixel positions at the same spike-firing time, and/or
- forming an image after the first accumulated/first/second pixel values are filtered, based on a spatial neighbor relationship of all pixel positions, and/or
- forming an image after the first accumulated/first/second pixel values are filtered, based on a spatiotemporal neighbor relationship of all pixel positions.

12. The spike signal-based display method according to claim 11, further comprising: generating an image using a spiked neural network or an artificial neural network, based on the same principle.

* * * * *